(12) United States Patent
Wolff et al.

(10) Patent No.: US 7,734,093 B2
(45) Date of Patent: Jun. 8, 2010

(54) PAPER-BASED UPLOAD AND TRACKING SYSTEM

(75) Inventors: Gregory J. Wolff, Redwood City, CA (US); Max McFarland, Sunnyvale, CA (US); John W. Barrus, Menlo Park, CA (US); Kurt W. Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 1656 days.

(21) Appl. No.: 10/852,768

(22) Filed: May 20, 2004

(65) Prior Publication Data

US 2005/0258246 A1    Nov. 24, 2005

(51) Int. Cl.
*G06K 9/18* (2006.01)
*G06K 9/54* (2006.01)

(52) U.S. Cl. .................. 382/183; 382/305

(58) Field of Classification Search .......... 382/100, 382/103, 139, 181, 183, 190, 101, 305; 235/375, 235/462.09, 462.1, 462.11; 709/225
See application file for complete search history.

(56) References Cited

U.S. PATENT DOCUMENTS

| | | | | |
|---|---|---|---|---|
| 5,490,217 A * | 2/1996 | Wang et al. | .................. | 380/51 |
| 5,878,056 A * | 3/1999 | Black et al. | .................. | 714/748 |
| 6,321,267 B1 * | 11/2001 | Donaldson | .................. | 709/229 |
| 6,591,291 B1 * | 7/2003 | Gabber et al. | .................. | 709/206 |
| 6,772,130 B1 * | 8/2004 | Karbowski et al. | .................. | 705/26 |
| 6,799,717 B2 * | 10/2004 | Harris | .................. | 235/375 |
| 6,898,625 B2 * | 5/2005 | Henry et al. | .................. | 709/206 |
| 6,976,007 B1 * | 12/2005 | Boucher et al. | .................. | 705/28 |
| 6,980,331 B1 * | 12/2005 | Mooney et al. | .................. | 358/400 |
| 6,988,199 B2 * | 1/2006 | Toh et al. | .................. | 713/170 |
| 6,999,204 B2 * | 2/2006 | Mortenson et al. | .................. | 358/3.23 |
| 7,106,464 B1 * | 9/2006 | Brylov | .................. | 358/1.15 |
| 7,139,102 B2 * | 11/2006 | Minato | .................. | 358/3.07 |
| 7,146,367 B2 * | 12/2006 | Shutt | .................. | 707/9 |
| 7,154,622 B2 * | 12/2006 | Constantin et al. | .................. | 358/1.15 |
| 7,249,175 B1 * | 7/2007 | Donaldson | .................. | 709/225 |
| 2002/0033974 A1 * | 3/2002 | Chen et al. | .................. | 358/474 |
| 2002/0083079 A1 | 6/2002 | Meier et al. | | |
| 2002/0133492 A1 | 9/2002 | Goldstein et al. | | |
| 2003/0097306 A1 * | 5/2003 | Boucher et al. | .................. | 705/26 |

(Continued)

FOREIGN PATENT DOCUMENTS

WO    WO 03/100579 A    12/2003

OTHER PUBLICATIONS

Baird, Henry S., "Digital Libraries an Document Analysis", Proceedings of the Seventh International Conference Document Analysis and Recognition, Aug. 2003, pp. 2-14, IEEE, Piscataway, NJ, USA.

(Continued)

*Primary Examiner*—Daniel G Mariam
(74) *Attorney, Agent, or Firm*—Blakely, Sokoloff, Taylor & Zafman LLP (57) ABSTRACT

A method and apparatus for performing paper-based upload and tracking of documents is disclosed. In one embodiment, the method comprises scanning a version of a document to obtain an image, the document having machine readable information, decoding the machine readable information from the image to obtain a destination specification, and uploading information corresponding to the image to a destination host specified by the destination specification.

83 Claims, 8 Drawing Sheets

U.S. PATENT DOCUMENTS

2004/0105599 A1* 6/2004 Siddle .................. 382/317
2005/0007624 A1* 1/2005 Henry .................. 358/1.15
2005/0022008 A1* 1/2005 Goodman et al. ........... 713/201
2005/0144059 A1* 6/2005 Schuessler .................... 705/9
2005/0188035 A1* 8/2005 Ueno ..................... 709/206

OTHER PUBLICATIONS

European Search Report for EP Patent Application No. 05253099.5, dated May 8, 2008, 4 pages.

\* cited by examiner

PAPER-BASED UPLOAD AND TRACKING SYSTEM

FIELD OF THE INVENTION

The present invention relates to the field of document processing, more particularly, the present invention relates to uploading and tracking documents.

BACKGROUND OF THE INVENTION

Millions of surveys, prescriptions, invoices, and other documents are sent back and forth every day. Typically the originator sends a form or other document to a recipient, the recipient fills out or otherwise processes the document, and sends the result back to the originator. Substantial effort and time is spent in the overhead of addressing these documents, tracking their transit, and maintaining audit trails.

Many document management systems have been proposed and implemented. These document management systems include systems that perform form generation, store forms in databases, perform forms filing, optical character recognition (OCR), and handle the coordination of requests with responses. However, these systems do not cross organizational boundaries. Transmitting an invoice or survey or other document from one organization to another requires the use of a standard format, such as paper, e-mail, Word document, web page, etc. Of these formats, paper has the unique property that it can be viewed and modified without digital technology, thus serving as the lowest common denominator for communication.

When paper documents are returned to an organization, they must be reintegrated with the document management system. This process requires some combination of scanning, data entry, and quality assurance. Oftentimes, this work is duplicated at both the sending and receiving organizations.

Of course, many systems exist for processing barcodes and imaging documents. The barcode processing may include scanning a barcode to obtain an identifier, placing images in files using the identifier and performing database lookup operations with the identifier.

A number of document management systems employ clients and servers. Some of these system process barcodes. For example, clients exist that scan barcodes to obtain network addresses and then send documents to those network addresses. Other clients rely on having the document destination be manually entered. Servers in document management systems accept images, process images, and generate responses.

SUMMARY OF THE INVENTION

A method and apparatus for performing paper-based upload and tracking of documents is disclosed. In one embodiment, the method comprises scanning a version of a document to obtain an image, the document having machine readable information, decoding the machine readable information from the image to obtain a destination specification, and uploading information corresponding to the image to a destination host specified by the destination specification.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A standardization of the information encoded in machine readable information (e.g., a barcode) and a process for clients to communicate with servers is described. The techniques described include automating uploads of images from a client device (the "uploader") to a server specified in the digital data embedded within the image. To this extent, the server and the client operate in a distinct manner. The server can accept uploads from multiple clients and the client can send uploads to multiple servers without being configured in advance to send to only a set group of servers. This is because the server is selected based on information on the paper, not based on the configuration. The techniques described herein build upon the existing standard infrastructure to automate the uploading process and provide substantial gains in efficiency.

In one embodiment, the originator creates a paper document that includes a machine readable information (e.g., barcode, RFID tags, watermarks, etc.) that carries one or more pieces of information. The originator sends this document to a client or recipient, who may modify this document in various ways and then use an office device or other imager to scan the document. This device, the uploader, automatically detects the machine readable information, decodes the information including the destination host specified by originator, and then sends this information along with a copy of the image to the destination host (e.g., server). In embodiment, the image and accompanying information is sent via HTTP.

In one embodiment, using standard barcodes, devices (e.g., multifunction peripherals MFP, aka networked copiers), and standard Internet protocols, the techniques described herein can greatly reduce or eliminate the inefficiencies of the current systems and simultaneously provide additional benefits to both the sender and receiver.

The originator no longer needs to maintain a system for imaging and sorting incoming mail. Errors in routing documents to appropriate places are reduced. Response rates should be higher, since this process is easier for the recipient, and overall cost of sending/receiving documents substantially lower.

Furthermore, this image upload system differs in a number of respects from existing systems. First, one embodiment of the system uses a standardized set of digital information that is embedded within the image via the machine readable information. This information includes the host name of the destination host to which the image should be sent. Second, the clients that perform the automatic upload communicate directly with the server without having to manually provide the address to which the paper document image of the document would be sent. By standardizing the digital information and the client to server communication, the upload system eliminates the manual steps of addressing and sorting documents.

Moreover, an internal document management system to handle the original documents and incoming images can take advantage of the digital information to provide local storage, tracking, and audit information related to documents that are sent.

Importantly, both the sender and receiver can use the system without intervening IT support. For example, the originator can direct a document to a desired server simply by placing the correct bar code on that document. In contrast, current document management systems require configuration of the routing system to be done by IT staff.

As an additional benefit, standardizing the upload system enables a number of additional value-added processes to operate on both the client and server side without costly systems integration. For example, an additional server might take the uploaded image, OCR it, and store the results in a database before sending the image along to the final destination. In this case, that database can be searched and results displayed according to the standard metadata embedded in the image (barcode).

Thus, embodiments of the system described herein support incremental adoption and could have a profound effect on business communication. However, unlike previous business machines, the techniques described herein tie together digital and paper information in a way that enables a wide array of new features and functions, and can be a platform which enables rapid, low-cost systems integration at the workgroup level.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview of the Process

Figure 1:
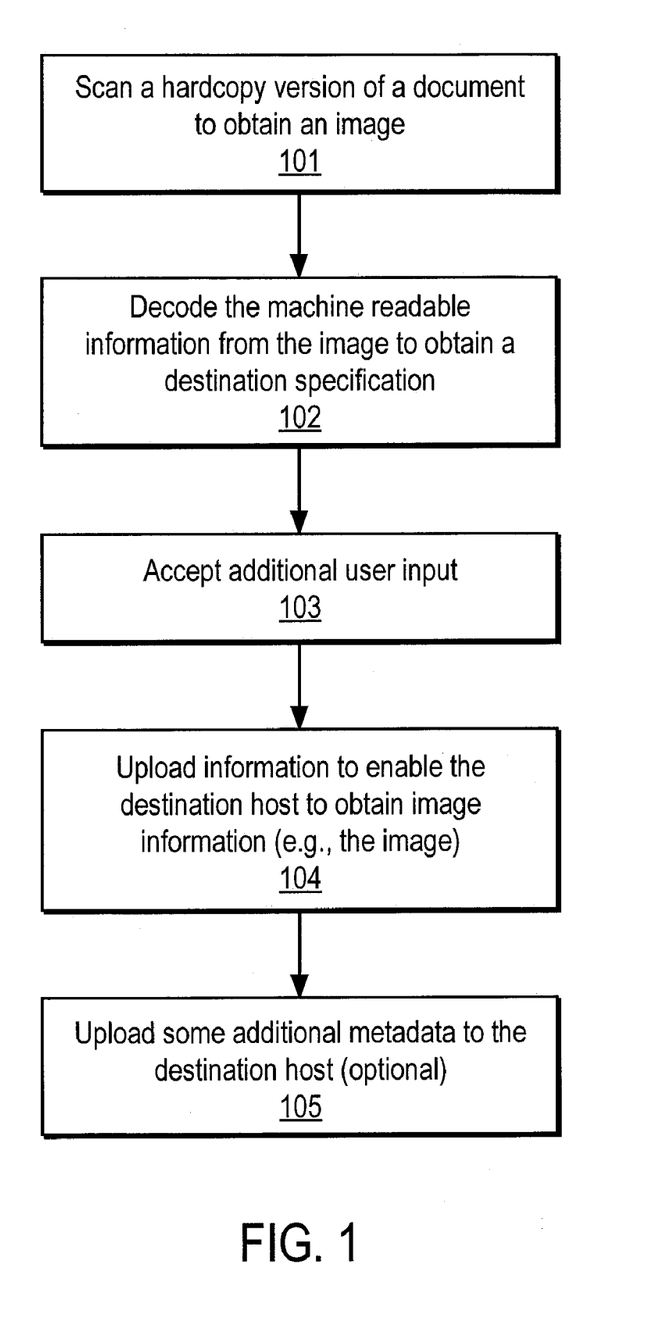
FIG. 1 is a flow diagram of one embodiment of a process for processing a document.

FIG. 1 is a flow diagram of one embodiment of a process for processing a document. The process is performed by processing logic that may comprise hardware (e.g., circuitry, dedicated logic, etc.), software (such as is run on a general purpose computer system or a dedicated machine), or a combination of both.

Referring to FIG. 1, the process begins by processing logic scanning a hardcopy version of a document to obtain an image (processing block 101). The document has machine readable information (e.g., a barcode, more than one barcode, portions of a barcode divided up and located in multiple parts of the image). In one embodiment, the machine readable information is affixed to the hardcopy version of the document using, for instance, a sticker.

The hardcopy version may comprise a modified version of an original document. The edits may be made by the individual causing the document to be scanned. For example, the hardcopy version could be a form (e.g., survey, medical form, etc.) filled in by the user. The modifications may include edits made to a document. In one embodiment, the hardcopy version of the document is paper; however, the terms "paper," "paper medium," or "sheet" as used in this application are intended to refer to any tangible medium on which information can be formed whether by a printing process, written, drawn, imprinted, embossed, etc. For purposes of this invention, the term "printing" is intended to encompass all manner of forming images on an image-bearing medium whether by optical, mechanical, thermal, or electrical methods, or combinations thereof.

After scanning the document, processing logic decodes the machine readable information from the image to obtain a destination specification (processing block 102). Prior to decoding, the processing logic first locates the machine readable information. Such a function is well known in the art, particularly where the machine readable information comprises a barcode.

In one embodiment, the destination specification refers to a combination of a destination host identifier and a document identifier. The destination host may be the device that originated the document; alternatively, the destination host is distinct from the device that originated the document. In one embodiment, the document host identifier comes from the domain name system (DNS). Thus, in such a case, the document host identifier is specified as "host.server.com" (e.g., a normal hostname). Alternatively, the document host identifier is specified by an IP address (Internet protocol namespace, e.g., 168.1.1.101), telephone or facsimile (fax) number "namespace", or other global system of identifiers. The document identifier may comprise a universal resource locator (URL).

In one embodiment, the destination specification is part of an upload specification. Besides the destination specification, the upload specification includes metadata that may be used, along (optionally) with flags, by the client device in the upload process (e.g., a response flag, a timeout flag, a min/max page indication, etc.) and other metadata to be sent to the destination host (e.g., information indicating field names, values, locations, etc.). This upload specification may be directly encoded in the machine-readable information. Alternatively, the machine-readable information may contain a pointer to the upload specification, preferably the hash value of the upload specification (that is, the value output by the hash function (e.g., SHA1 or MD5) applied to the upload specification). If the machine-readable information contains such a hash value, the client device searches locally for a stored upload specification with that hash value. If the client device does not find one, the client device asks one or more servers for the upload specification. The client device confirms any responses from the servers by checking the hash value of the response to ensure a match exists.

Note that more than one upload specification may be found on a single page. This may be a second set of machine readable information. For example, a second barcode sticker may be placed on the page. In one embodiment, the client device processes all such upload information and performs the corresponding upload operations for each.

Optionally, processing logic receives additional user input (processing logic 103). The operation of receiving additional user input may include processing logic requesting confirmation from the user that the image or information corresponding to the image may be sent to the destination specification. This request may be through a user interface. In one embodiment, in implementations requiring user permission to send to the destination host, processing logic does not upload the image to the destination host or any other metadata until the user confirmation has been received. In an alternative embodiment, processing logic implements a black list that includes a set of one or more destination hosts to which no images (or metadata) will be uploaded. In such a case, if the processing logic encounters a destination host that is on its black list, it halts processing of the scanned document and no upload occurs. Similarly, processing logic may implement a white list that includes a set of one or more destination hosts to which all images (and metadata) may be uploaded without need of confirmation. Note that the black and white lists may be stored in storage on or accessible by a client device performing the processing described herein.

Using the decoded information, processing logic uploads information to enable the destination host specified by the destination specification to obtain the image or information corresponding to the image (processing block 104). In one embodiment, information uploaded is the image itself. In another embodiment, the information uploaded comprises metadata that includes an identifier or locator sufficient to allow the destination host to request and/or obtain the original scanned image from the client device or some other location at a later time. For example, this metadata may comprise the name and location of the client device uploading the image or may comprise a tracking number for use in tracking the image on the client device or in another storage area.

In one embodiment, only a portion of the image is uploaded to the destination host. In such a case, processing logic segments the image and only sends a predetermined number of segments. Note that metadata in the machine readable information may specify the location of the segments that are to be sent Optionally, in one embodiment, processing logic uploads some additional metadata to the destination host (processing block 105). This metadata may comprise an indication of the validation method for one or more fields in the image (e.g., OCR or user input for field information).

Note that it is not necessary that the upload client contact the destination host directly. In an alternative embodiment, the upload client may contact the destination host through an intermediary.

In one embodiment, at some point in the process (e.g., after scanning the document, after uploading the image, etc.), the client device marks the document. The mark may be used to indicate that the document has been processed. This may be performed to prevent the same document from being processed again by the same client device or other client devices. Thus, the processing logic marks the hardcopy version of the document after scanning and, upon encountering the mark during a subsequent scan of the document at a later time, prevents its further processing. By preventing its further processing, an image that was produced as part of the rescanning process or information about the image is not uploaded to the destination host, nor is information provided to the destination host to enable its uploading. Note that the marking may be implemented by the use of a marking engine in the paper path.

In one embodiment, the mark created by the client device is made onto the top of the existing bar code (or other machine readable information). The mark may be such that other client devices are unable to read the bar code, thereby preventing the document from being processed further. In another embodiment, the mark comprises an additional bar in the same format and having the same upload specification information except that metadata is included that indicates that the document has already been processed.

The marking scheme described above does not have to be used to prevent a document from being processed another time. For example, in one embodiment, upon scanning a document with the machine readable information discussed above, the client device checks local storage to determine if a document with the same identifier has been processed previously. If so, and if the metadata indicates that the document is to be processed only once, then the client may refuse to process the document and may provide the user with an indication of its refusal by providing the user with an error message on a display.

Figure 2:
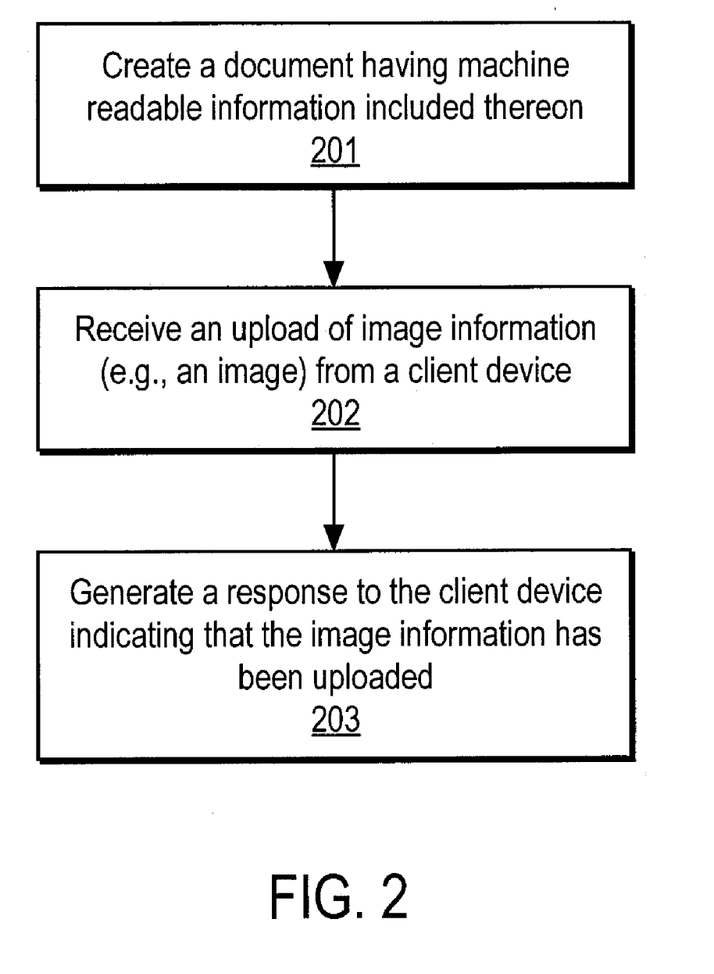
FIG. 2 is a flow diagram of one embodiment of a process for processing an image.

FIG. 2 is a flow diagram of a process for processing an image received by a destination host. The process is performed by processing logic that may comprise hardware (e.g., circuitry, dedicated logic, etc.), software (such as is run on a general purpose computer system or a dedicated machine), or a combination of both.

Referring to FIG. 2, the process begins by processing logic creating a document having machine readable information included thereon (processing 201). The machine readable information may include an upload specification that specifies a location of a destination host and a document identifier identifying the document. The destination host may store (or have access to storage that stores) a copy of the document. The storage may be a document repository (e.g., a database).

At some time later, processing logic receives an upload of an image from a client device or information about the image (e.g., information to enable the destination host to request the image)(processing block 202). The image corresponds to a scanned version of the document original document. A document identifier is included in the uploaded information. Processing logic may store the image with the original in a document repository. Identifying the location of the original document is performed using the document identifier in the machine readable information.

In one embodiment, processing logic processes the image that is received. The processing may involve extracting information from the image and storing the extracted information. The processing logic may examine fields in the image, convert the information in those fields into a predetermined format (e.g., ASCII), and store the converted information into a database. This would be useful for processing survey forms that use checkboxes. By examining the fields where the checkboxes are in the image, the data from the survey can be identified and then subsequently stored in a database. Similarly, for a medical record application, a doctor's notes or other information may be extracted from the image uploaded to the destination host and automatically entered into the appropriate account in a medical records system. Alternatively, the processing logic may perform additional processing (e.g., OCR) on the extracted information. Thus, in these cases, it is not necessary to store the image.

Optionally, in response to receiving the upload, processing logic generates a response to the client device indicating that image has been uploaded (processing block 203). Processing logic may generate an HTML page as a response. The HTML page may be displayed to the user on a screen allowing the user to interact directly via a Web browser with the destination host.

Additional Metadata and Alternative Embodiments

In one embodiment, decoding the machine readable information obtains metadata as well as the destination host identification information. In one embodiment, the client uses this metadata to control its operation prior to contacting the destination host.

Form Field Extraction Processing

Figure 3:
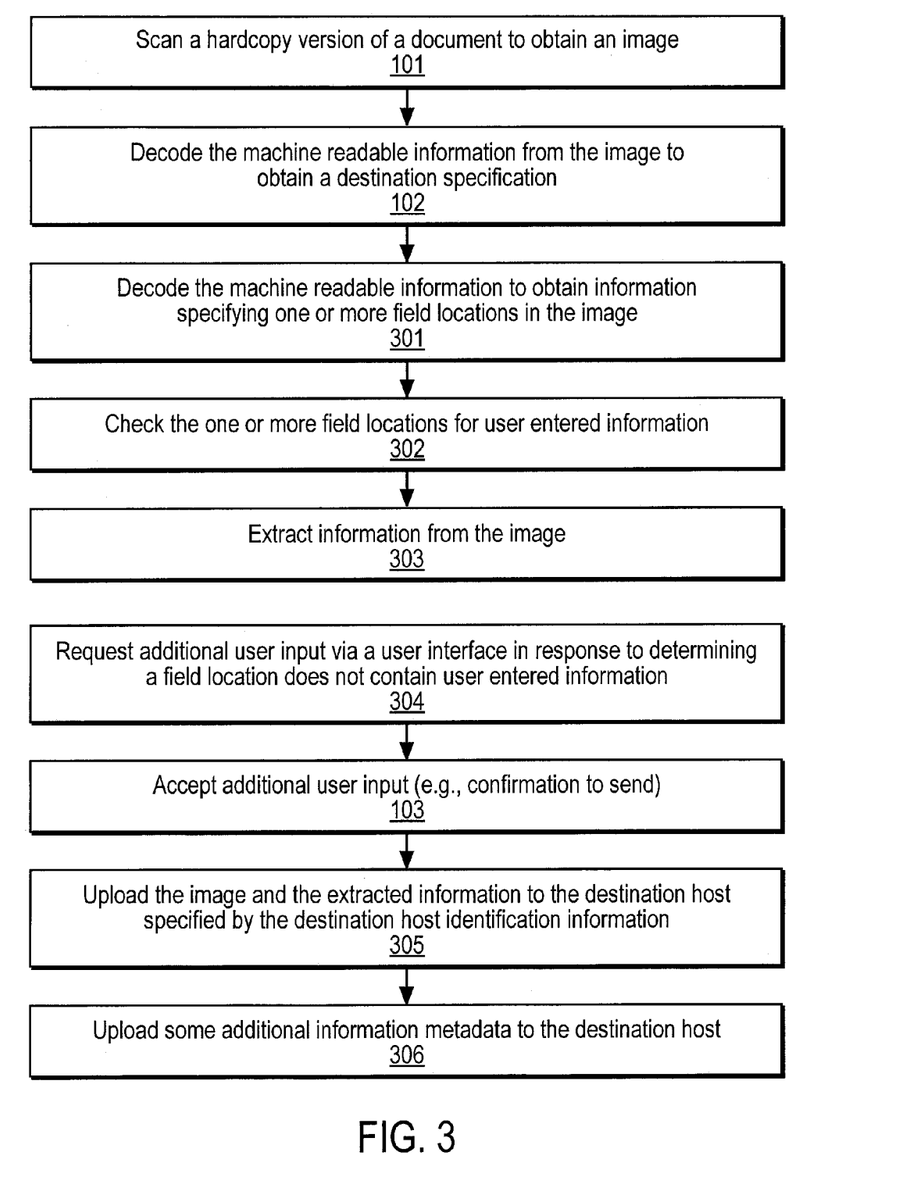
FIG. 3 is a flow diagram of an alternative embodiment of a process for processing a document.

FIG. 3 is a flow diagram of an alternative embodiment of a process for processing a document. The process of FIG. 3 is a variation of the process in FIG. 1 and, thus, includes some of the same processing blocks. The process is performed by processing logic that may comprise hardware (e.g., circuitry, dedicated logic, etc.), software (such as is run on a general purpose computer system or a dedicated machine), or a combination of both.

Referring to FIG. 3, the process begins by processing logic scanning a hardcopy version of a document to obtain an image (processing block 101). The document has machine readable information (e.g., a barcode, more than one barcode).

After scanning the document, processing logic decodes the machine readable information from the image to obtain a destination specification (processing block 102). As discussed above, in one embodiment, the destination specification refers to a combination of a destination host identifier and a document identifier. In one embodiment, the document host identifier comes from the domain name system (DNS). Thus, in such a case, the document host identifier is specified as "host.server.com" (e.g., a normal hostname). Alternatively, the document host identifier is specified by an IP address (Internet protocol namespace, e.g., 168.1.1.101), telephone or facsimile (fax) number "namespace", or other global system of identifiers. The document identifier may comprise a universal resource locator (URL).

Processing logic also decodes the machine readable information to obtain information specifying one or more field locations in the image (processing block 301). The field locations may be specified relative to the location of the machine-readable information on the document. Using the field location information, processing logic checks the one or more field locations for user entered information (processing block 302) and extracts information from the image (processing block 303).

In one embodiment, the process includes requesting additional user input via a user interface in response to determining a field location does not contain user-entered information (processing block 304). This processing may include processing logic determining that a field is blank. Blank detection is well known in the art.

Optionally, processing logic requests confirmation from the user that the image information may be forwarded to the destination host (processing logic 103). This request may be through a user interface.

Thereafter, processing logic uploads the image and the extracted information to the destination host specified by the destination specification (processing block 305). Thus, processing logic sends user-entered information with the image to the destination host. Note that sending information may be performed by including the information in the header of a communication (e.g., an HTTP communication). For example, in the case of multiple fields, each field name may be sent to the destination host with the data that actually occurs in the field (e.g., an actual image of the region) and/or symbolic data (e.g., the result of performing OCR on the region).

Optionally, in one embodiment, processing logic uploads some additional metadata to the destination host (processing block 306).

Response Processing

In one embodiment, after uploading the image to the destination, processing logic waits to receive a response from the destination host. The response may indicate that the uploading of the image was successful. The response may comprise a document (e.g., a webpage). Note that this response is in addition to an acknowledgement at the transport level in the communication protocol used between the client device and the destination host.

In one embodiment, additional metadata encoded into the machine readable information may include a response field indicating whether the client is to wait for a response from the destination host after uploading the image. In such a case, the processing logic of the client waits for the response only if required by metadata encoded and stored in the machine readable information.

Furthermore, in one embodiment, the client device waits for a predetermined period of time to receive a response, and if a response is not received, then the client device performs one or more operations. Similarly, in an embodiment in which a response is not required, when the upload operation fails, then the client device may perform one or more of these operations. These operations may include, for example, retrying the upload operation immediately or at a predetermined period of time in the future, notifying the user, and/or taking no further action and indicating such to the user. In one embodiment, the upload specification sets forth alternative destination hosts to be tried if the primary destination host is not reachable. In one embodiment, the length of the timeout period and/or the actions to be taken by the client device in response to a timeout occurring or in response to a failed upload may be specified or indicated by metadata in the machine readable information.

In response to receiving the response from the destination host, processing logic in the client may display (e.g., print) the response. The response may also be displayed in an interactive manner to allow additional data to be entered and sent to the destination host.

Courtesy Copies

As part of one of the processes described herein, in one embodiment, processing logic of the client device causes a courtesy copy of the image information (e.g., image or metadata) being uploaded to be stored. The additional metadata in the machine readable information may include courtesy copy information (e.g., a flag) indicating whether a copy of the image (and potentially other metadata and responses) is to be stored in a specified destination in addition to, and separate from, the copies sent the destination host. In one embodiment, no response is expected or required with respect to the storage of the courtesy copy.

In one embodiment, a courtesy copy of the image and the metadata is sent if a courtesy copy flag is set in the upload specification. This upload specification may be the same one specifying a destination for the image or information to enable the destination host to obtain a copy of the image or may be a separate upload specification. The upload specification may specify the location of a courtesy copy document repository (e.g., database, server, etc.) for storing courtesy copies or there may be a default courtesy copy document repository. In one embodiment, the upload specification is added to the image. In one embodiment, the client device (e.g., an MFP) includes a button or other user input device that may be used to indicate that a courtesy copy is to be stored.

In one embodiment, the processing logic also stores any responses from the destination hosts in the courtesy copy document repository. In one embodiment, the destination hosts for the upload destinations do not know about the courtesy copy, although in other embodiments, the destination hosts are aware of the courtesy copies.

In one embodiment, the processing logic also sends any error messages associated with uploading the image to the destination host to the device specified in the additional machine readable information.

Local Storage and the Use of Tracking Numbers

As part of one of the processes described herein, in one embodiment, processing logic of the client device generates a tracking number for use as a locator in storing a copy of the image being uploaded, metadata and additional annotation information (e.g., timestamps. etc.). The storage may be a local or locally accessible memory.

The tracking number may be randomly chosen, generated by the client, or extracted from the upload specification. In one embodiment, the tracking number is the hash of the destination specification.

The tracking number is made available to the destination host. As discussed herein, metadata such as the tracking number may be sent in a header as part of the communication sending the image to the destination host.

After generating the tracking number, at some future time, the client (or another device storing the information) receives a request using the tracking number. In response thereto, additional information is added to the stored annotations and/or the stored image, metadata and annotations are provided to the requesting device. In one embodiment, the image may be stored in a database or directory structure with a path name /H/img.tiff, metadata /H/meta.xml, and annotations /H/annotations.xml. Note that each of these may be optionally encrypted. In one embodiment, the encryption/decryption key may be obtained from the upload specification.

Figure 5A:
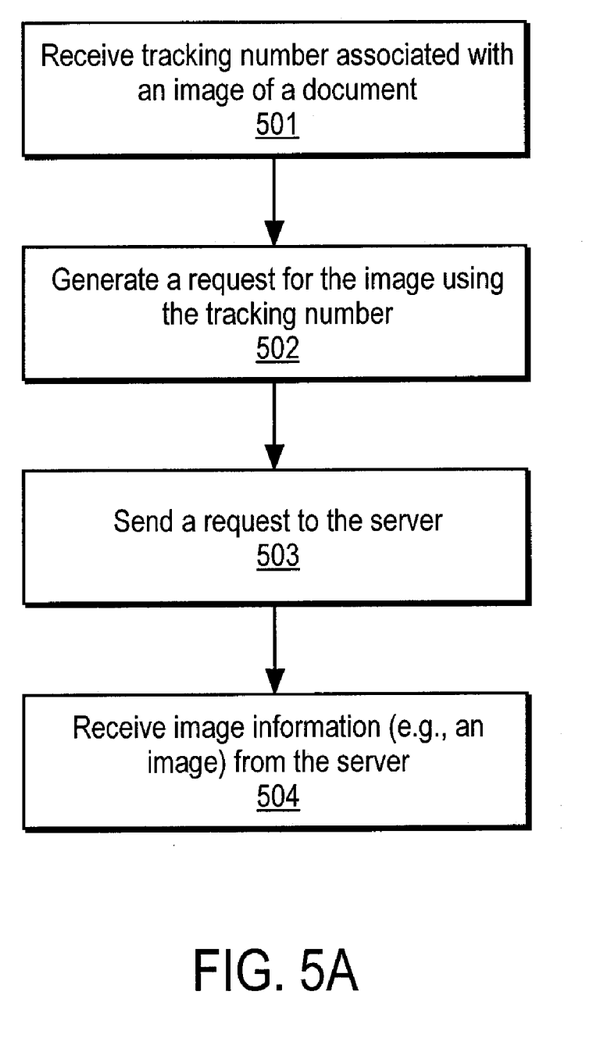
FIGS. 5A and 5B are flow diagrams of embodiments of a process for handling an image information request using a tracking number.
Figure 5B:
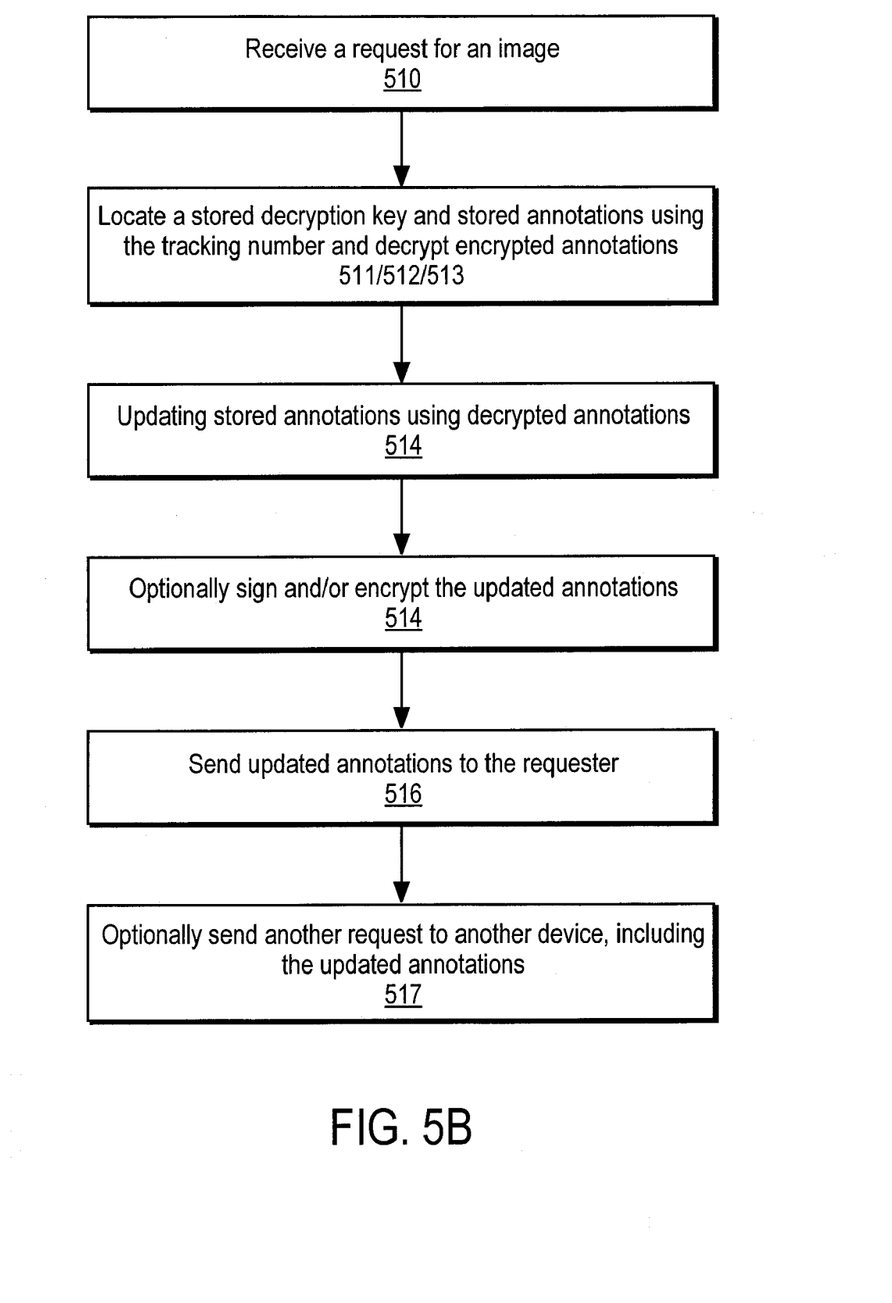

FIGS. 5A and 5B are flow diagrams of embodiments of a process for handling an image information request using a tracking number. The process is performed by processing logic that may comprise hardware (e.g., circuitry, dedicated logic, etc.), software (such as is run on a general purpose computer system or a dedicated machine), or a combination of both.

Referring to FIG. 5A, the process begins by receiving a tracking number associated with an image of a document (processing block 501). The request is generated by processing logic in a destination host. Next, processing logic generates a request for the image using the tracking number (processing block 502). Then processing logic sends the request to a server (processing block 503). Thereafter, the server (e.g., the upload client device) processes the request. Subsequently, processing logic receives the image or related metadata/annotations after the server accesses the information using the tracking number (processing block 504). In one embodiment, the request includes annotations (additional metadata) that the server merges (and saves) with stored information.

Referring to FIG. 5B, the process begins by processing logic receiving a request for an image that includes encrypted annotations and a tracking number (processing block 510). In response to the tracking number, processing logic locates a stored decryption key and stored annotations using the tracking number (processing block 511) and decrypts the encrypted annotations to produce decrypted annotations (processing block 512). Processing logic then updates the stored annotations using the decrypted annotations (processing block 513) and optionally signs the updated annotations (processing block 514). Updating the stored annotations may be performed by adding the new annotations to the previously stored annotations. Processing logic then sends the updated annotations to a requester (processing block 515). Optionally, processing logic may encrypt and/or sign the updated annotations prior to sending. In such a case, the processing logic may send a signature to the requester (processing block 516).

Processing logic in the server may send a new request to another device that includes the updated annotations (processing block 517). This device may be specified in an upload specification of a document corresponding to the image.

Other Alternative Embodiments

The metadata included in the upload specification may include an indication of the maximum number of pages in the document or the minimum number of pages in the document. The client uses this information to determine if all the pages of the document have been received and scanned.

In one embodiment, the additional metadata included in the upload specification includes an indication of whether encryption is needed when uploading the image or any other metadata to the destination host. In response thereto, the client processing performs encryption on the image data as well as any other data that is being sent. In one embodiment, the additional metadata may include a digital signature of the originator of the document and a public key of an originator of the document to facilitate the encryption process. The public key of the client may be added as part of the metadata uploaded to the destination host. (The client device may use their private key to sign and/or encrypt the upload as well as future responses to requests related to the particular upload.) In one embodiment, the additional metadata includes information such as a hash value computed based on a key on password.

In one embodiment, an encryption flag is set in the upload specification, and in response thereto, the client device computes the hash of the destination specification and uses the destination specification as an encryption key. The client then encrypts the information to be uploaded using this encryption key (e.g., the image information and the metadata). The client device may optionally store the destination specification and encrypted information locally using the computed hash of the destination information as an identifier/locator. The client device sends the encrypted information to the destination host along with computed hash value as an identifier/locator.

In one embodiment, the additional metadata included in the upload specification includes an indication that a password is required to upload the image to the destination host and includes information to enable the client to locally verify the password. In one embodiment, the additional metadata includes information such as a hash value computed based on the password. Alternatively, the additional metadata may include an indication that a password is to be entered by the user and sent with the image to the destination host, which verifies that the proper password was received.

The additional metadata included in the upload specification may include version information specifying which version of the document has been scanned in by the client.

The additional metadata included in the upload specification may include update information specifying whether the document may be updated.

The additional metadata included in the upload specification may include a pointer to another location that contains additional metadata and/or instructions (e.g., Java instructions) for use by the client device performing the processing. In one embodiment, the location directed to by the metadata is a central server or data registry, local or global. In one embodiment, the only metadata in the machine readable information is a pointer to another location that contains all the metadata needed by the client to perform its operations, including the specification of the destination host. A hash function may be used and included in the machine readable information. The processing logic applies the hash function to the metadata to determine the location to access the information needed to process the scanned sheet.

System Overview

Figure 4A:
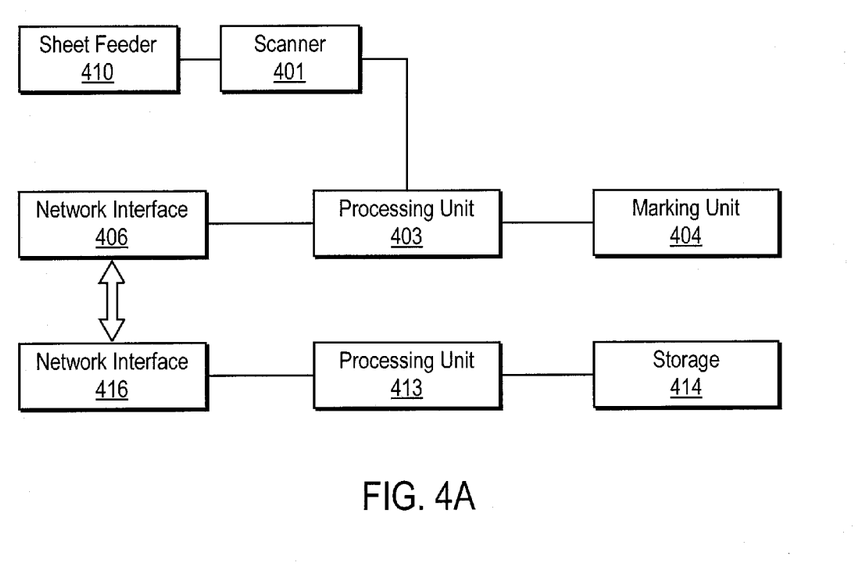
FIG. 4A is a block diagram of a system.

In one embodiment, the processing logic is implemented with a system, such as shown, for example, in FIG. 4A. Referring to FIG. 4A, a client 400 comprises a scanner 401 to scan a sheet having the machine readable information (e.g., a bar code). Optionally, system 400 may include a sheet feeder 410 to supply the sheet to scanner 401.

Processing unit 403 locates and decodes the machine readable information, and performs the operations set forth herein.

Marking unit 404 is coupled to processing unit 403 marks the paper with an indicator that indicates that the document has been processed. Note that in one embodiment, processing unit 403 and marking unit 404 may be combined into a marking engine. Thus, there is a single paper path from sheet feeder 410, to scanner 401, to processing unit 403 and to marking unit 404.

The client also includes network interface 406 for communicating with the destination host.

The system includes a destination host having a network interface 416 for communicating with the client, a processing unit 413 that creates machine readable information (e.g., barcodes) to place on documents. Processing unit 414 also stores and/or processes image information in a manner described above. Storage 415 stores original documents, uploaded images and image information. Optionally, the destination host includes a printer to create a hardcopy version of a document.

Figure 4B:
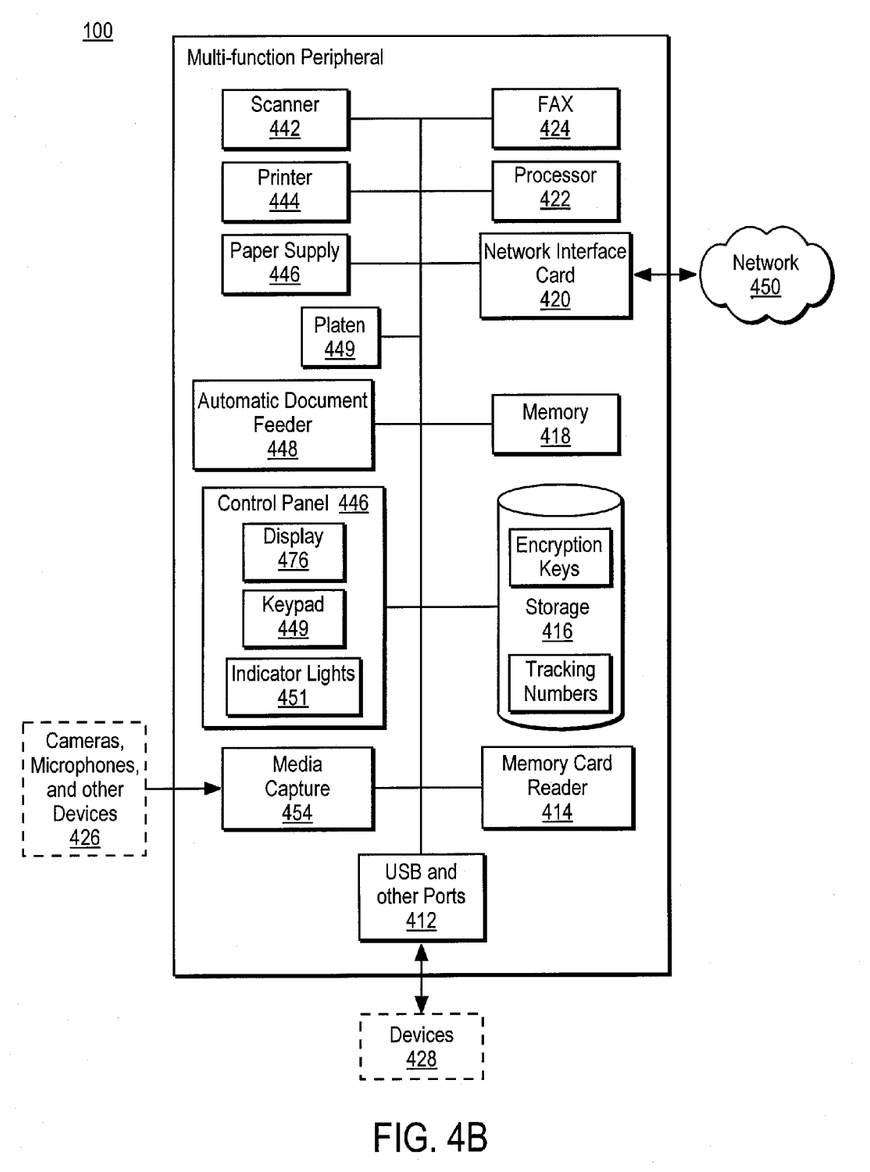
FIG. 4B illustrates an example of a typical MFP.

In one embodiment, the client and/or destination host of FIG. 4A is implemented as a multifunction peripheral (MFP). FIG. 4B is an illustrative example of a typical MFP. Referring to FIG. 4B, the MFP is made up of various components, some of which are not required in the operation of this invention. The MFP has a scanner 442 which can image pages of a document and in conjunction with the automatic document feeder 448 can image multiple pages rapidly. Images of pages can be stored in a non-volatile storage area 416, which might be a disk drive or in any other memory storage area like the memory 418. The MFP also contains a printer or marking mechanism 444, which can retrieve paper from the paper supply 446 or the scanner platen and print images or print marks on documents, which are stored in the memory 418, storage 416, obtained directly from the scanner 442, obtained from the processor 422 or from the network interface card 420, which can receive image print requests and images from the external network 450. Images to be printed can also come from the memory card reader 414, media capture devices 426 and 428 through a media capture port 454 or a USB or other port 452. Images can also be received or sent out through the fax interface 424.

Storage 416 may also store tracking numbers and encryption keys.

The MFP can access other forms of media through electronic data input peripherals which may include magnetic readers for magnetic media such as floppy disks, magnetic tape, fixed hard disks, removable hard disks, memory cards, and so on. Peripherals may also include optical media readers for optical storage media such as CDs, DVDs, magneto-optical disks, and the like. Information obtained from these peripherals can be incorporated otherwise associated with scanned-in documents to enhance the document content.

The processor 422 controls the operation of the MFP components shown in FIG. 4B. The control panel 446 having a display 476, a keypad 489 and indicator lights 451 can be used to instruct the processor 422 to use the components of the MFP to make copies, scan documents or print faxes. MFPs are available from many companies, including Ricoh Company, Ltd. in Tokyo, Japan, which makes a programmable MFP called the Aficio 2035 S/P, which contains many of the components shown in FIG. 4B. Such an MFP can be modified to include the marking engine and optional erasing engine described herein. Any suitably equipped MFP could be used in practicing this invention.

The memory 418 of the MFP contains modules that allow the operation of the MFP as well as the practice of the present invention.

Figure 4C:
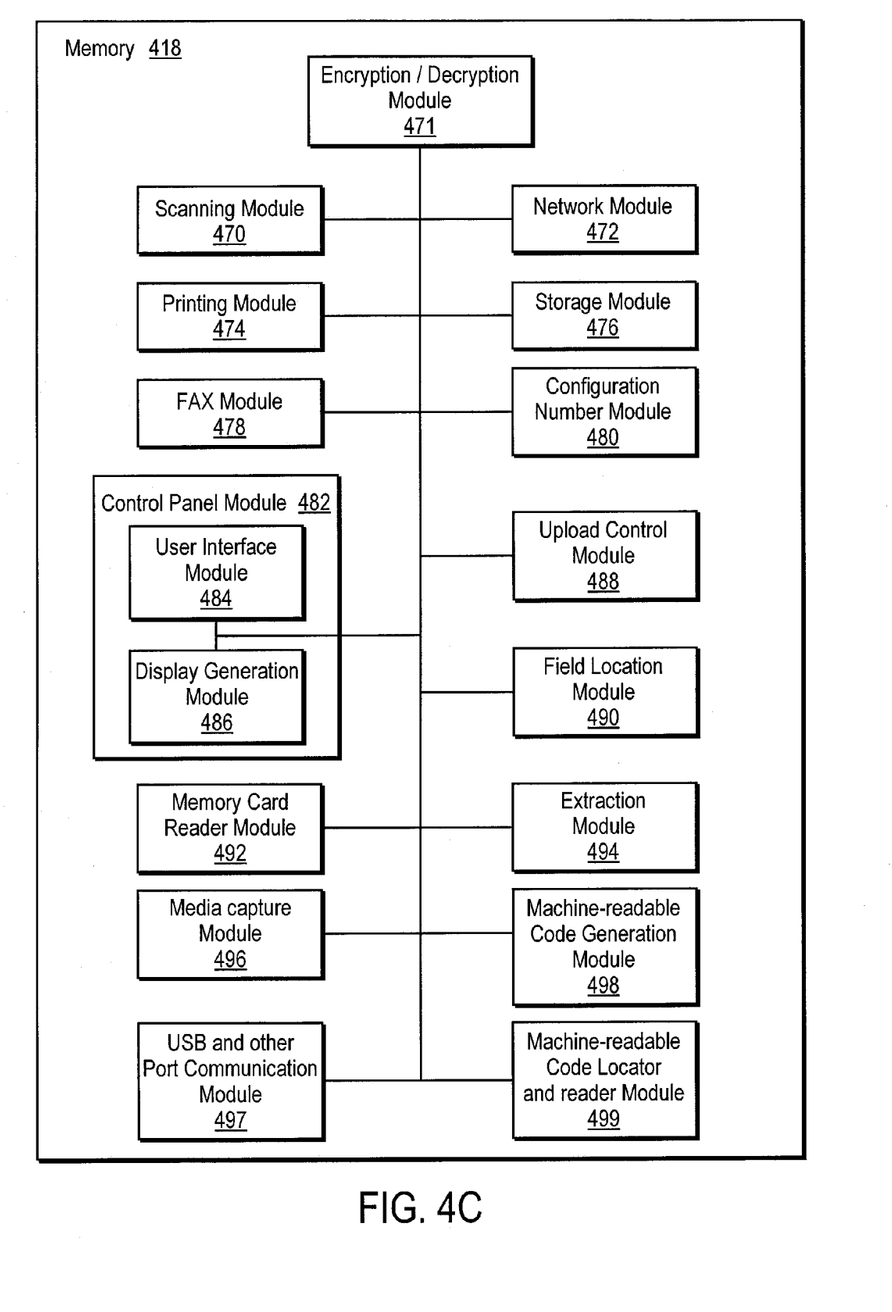
FIG. 4C is a high level representation of various program modules for operating an MFP.

FIG. 4C is a high level representation of various program modules resident in memory 418 for operating the MFP in accordance with the different aspects of the present invention. The scanning module 470 contains the instructions that the processor 422 in combination with the scanner 442 can use to scan pages of documents. The printing module 474 contains control instructions for receiving an image or a description of an image and driving the printer 444 causing the image to be printed on a piece of paper a print mark on a document. MFPs are known in the art and made by many different companies so a complete description of the operation of the MFP is not necessary. The fax 478, network 472, storage 476, image conversion 494, memory card reader 492, media capture 496, USB and other port 497 modules will not be described because their purpose and function is well understood.

In addition to the typical MFP functions, the following modules are used for the operation of this invention. The machine-readable information locator and reader module 499 locates the machine-readable information from the image and decodes the information to obtain destination host identification information and/or metadata as set forth above. Machine-readable information generation module 498 generates an additional machine-readable information (e.g., barcode) for marking on the document by printing module 474, particularly when using courtesy copies. Preferably, machine-readable codes are barcodes, though there are many ways of creating machine-readable indicia. Barcodes are robust and take up little space and are easily decoded using standard hardware and software. One company that sells software for locating and decoding a variety of barcodes is Tasman Software of Leeds, United Kingdom. Software for creating and printing barcodes can be purchased from IDAutomation.com, Inc. of Tampa, Fla. Decoding machine-readable codes is well known in the industry.

Confirmation module 180 requests confirmation through the use of user interface module 484 and display generation module 486 from the user that the destination host is correct. Upload control module 488 operates in conjunction with network module 472 to upload the image to the destination host specified by the destination host at application information decoded by machine-readable locator and reader module 499. Upload control module 488 is also responsible for uploading metadata, if any, to the destination host.

In one embodiment, the MFP includes a field location module 490 that checks one or more field locations in the image for user entered information. Extraction module 494 extracts the information from the field locations. Thereafter, upload control module 488 combines the image with the extracted information and sends both to the destination host using network module 472 or other communication capabilities such as communication module 497 or fax module 478.

In one embodiment, machine-readable co-generation module 498 generates code when originated a document that may be printed using printing module 474 with the barcode or other machine-readable information thereon and/or sent via network module 472. A upload document processing module may also be included to receive an upload of an image from a client device and store portions of the image or the entire image in memory. Such a device may also have a response generation module that generates a response to the client device indicating that the image or portion thereof was uploaded.

Encryption/decryption module 471 performs encryption and decryption necessary as an upload client or destination host.

The control panel is controlled by the processor 422 using information from the user interface module 484 and the display generation module 486, which are part of the control panel module An Example Application The techniques described herein may be used in the medical field. In one embodiment, medical service providers have a "Digital Stamp" that includes machine-readable information they place on referral forms, request for lab tests, prescriptions, HIPPA forms, and other patient related information.

A patient may hand carry this form to a second provider (e.g. a lab, therapy clinic, or insurance company) who may fill in some additional information. The second provider scans the document (or images it in some way) using an office device (e.g., MFP, FAX, PC, camera, . . . ). The device detects the Digital Stamp and decodes the following standardized information: a destination host name; a document identifier; metadata field(s)(e.g., patient ID); a response requested field; a timeout action; a courtesy copy indicator; and a digital signature and a public-key of originator (optional)

Using this information, the device sends (POSTS) the scanned image to the destination host using a standardized URL including the identifier and metadata as part of the POST. The device receives the response from the specified host and displays that to the user. (This could be a document that is printed out, or a web page that is displayed.) Optionally the device could show the user the routing information and wait for confirmation before actually sending the image.

The destination host can process this incoming image according to the business logic of that originating provider. In particular, lab results might be directly added to a patent's file.

Note that in one embodiment, metadata is added by the client device that may or may not be shared with the destination host. For example, the annotations for an uploaded document might include a local patient identifier (entered manually or automatically extracted). The annotations might also include locators associated with other previously uploaded documents.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in themselves recite only those features regarded as essential to the invention.

We claim:

1. A method comprising:
   scanning a version of a document to obtain an image, the document having machine readable information;
   decoding the machine readable information from the image to obtain a destination specification; and
   uploading information corresponding to the image directly to a selected storage location of a destination host specified by the destination specification upon determination that the destination host is not on a list of destination hosts to which no images are permitted to be uploaded.

2. The method defined in claim 1 wherein the information corresponding to the image comprises the image.

3. The method defined in claim 1 wherein the destination specification comprises a destination server and a document identifier associated with the destination server.

4. The method defined in claim 1 wherein the destination specification comprises a universal resource locator (URL).

5. The method defined in claim 1 wherein the destination specification comprises a facsimile (fax) number and a document identifier.

6. The method defined in claim 5 wherein the document identifier comprises a universal resource locator (URL).

7. The method defined in claim 1 further comprising requesting confirmation, via a user interface, that upload is to occur.

8. The method defined in claim 7 further comprising halting processing if the destination host is identified as being on the list.

9. The method defined in claim 1 wherein decoding the machine readable information obtains metadata used to process upload image information.

10. The method defined in claim 9 wherein the metadata includes one or more of a group consisting of: an indication of the maximum number of pages in the document, an indication of the minimum number of pages in the document, a response field indicating whether to wait for a response from the destination host after uploading the image, timeout information indicating appropriate action to take in response to not receiving a response from the destination host after a period of time after uploading the image to the destination host when a response from the destination host is required, courtesy copy information indicating whether a copy of the image is to be stored to a location in addition to the destination host, version information specifying which version of the document has been scanned, update information specifying whether the document may be updated, a digital signature of the originator of the document, and a public key of an originator of the document.

11. The method defined in claim 10 further comprising uploading at least a portion of the metadata to the destination host.

12. The method defined in claim 1 further comprising uploading annotations and metadata to the destination host.

13. The method defined in claim 12 wherein the machine readable information includes a pointer to a storage location including the destination specification and metadata to control one or more operations in processing the image.

14. The method defined in claim 12 wherein the machine readable information includes metadata, and further comprising applying a hash function to the metadata to determine a location of information needed to process the image.

15. The method defined in claim 14 wherein the information needed to process the image comprises the destination specification.

16. The method defined in claim 1 further comprising extracting information from the image, and uploading extracted information along with the image information.

17. The method defined in claim 1 further comprising:
obtaining information specifying one or more field locations from the machine readable information; and
checking the one or more field locations for user entered information.

18. The method defined in claim 17 further comprising sending the user entered information with the information corresponding to the image to the destination host.

19. The method defined in claim 17 further comprising:
determining whether each field location includes user entered information; and
requesting additional user input via a user interface in response to determining at least one field location does not contain user entered information.

20. The method defined in claim 1 further comprising:
associating a tracking number with the image; and
using the tracking number to access a stored version of the image or associated information.

21. The method defined in claim 20 wherein the tracking number is the hash value of the destination specification.

22. The method defined in claim 20 wherein the tracking number is a hash value of one or both of the image and additional information.

23. The method defined in claim 20 wherein storing the image comprises storing an encrypted version of the image.

24. The method defined in claim 20 further comprising:
receiving a request for the image from the destination host using the tracking number;
retrieving the image from the local storage; and
sending the retrieved image to the destination host.

25. The method defined in claim 1 wherein the hardcopy version of the document comprises a modified version of an original document.

26. The method defined in claim 1 further comprising receiving a response from the destination server indicating whether uploading of the image was successful.

27. The method defined in claim 26 wherein receiving the response includes waiting for the response only if required by metadata encoded and stored in the machine readable information.

28. The method defined in claim 26 further comprising displaying the response.

29. The method defined in claim 26 further comprising collecting additional user input.

30. The method defined in claim 26 further comprising printing the response.

31. The method defined in claim 1 further comprising:
waiting for a response from the destination host indicating whether uploading of the image was successful; and
retrying to upload the image to the destination host after a predetermined time has occurred if the response has not been received.

32. The method defined in claim 1 further comprising:
waiting for a response from the destination host indicating whether uploading was successful; and
retrying to upload the image to another destination host after a predetermined time has occurred if the response has not been received.

33. The method defined in claim 1 further comprising requesting additional data from the user before uploading the image information.

34. The method defined in claim 1 further comprising marking the hardcopy version of the document after scanning.

35. The method defined in claim 1 further comprising:
reading additional machine readable information from the image; and
sending another copy of the image to a device specified in the additional machine readable information.

36. The method defined in claim 35 further comprising:
receiving a response from the destination host indicating whether uploading of the image was successful; and
sending a copy of the response to the device specified in the additional machine readable information.

37. The method defined in claim 36 further comprising sending an error associated with uploading the image to the destination host to the device specified in the additional machine readable information.

38. The method defined in claim 1 wherein the machine readable information comprises a barcode.

39. The method defined in claim 1 wherein the machine readable information is affixed to the hardcopy version of the document.

40. The method defined in claim 1 wherein the hardcopy version of the document is paper.

41. The method defined in claim 1 further comprising encrypting the information using an encryption key prior to uploading the information.

42. The method defined in claim 41 further comprising computing a hash of the destination specification and using the destination specification as the encryption key.

43. The method defined in claim 42 further comprising storing the destination specification and the encrypted information and using the computed hash of the destination specification as a locator to obtain the encrypted information from storage.

44. The method defined in claim 42 further comprising sending the computed hash of the destination specification to the destination host along with the encrypted information.

45. An apparatus comprising:
a scanner to scan a document to produce an image;
a processing unit to identify a destination host from machine-readable information on the image; and
a communication interface to upload information corresponding to the image directly to a selected storage location of the destination host upon determination that the destination host is not on a list of destination hosts to which no images are permitted to be uploaded.

46. The apparatus defined in claim 45 wherein the image information comprises the image.

47. The apparatus defined in claim 45 wherein the destination specification comprises a destination server and a document identifier associated with the destination server.

48. The apparatus defined in claim 45 wherein the decoder obtains metadata used to process upload image information.

49. The apparatus defined in claim 45 wherein the decoder decodes the machine readable information to obtain metadata that includes one or more of a group consisting of: an indication of the maximum number of pages in the document, an indication of the minimum number of pages in the document, a response field indicating whether to wait for a response from the destination host after uploading the image, timeout information indicating appropriate action to take in response to not receiving a response from the destination host after a period of time after uploading the image to the destination host when a response from the destination host is required, courtesy copy information indicating whether a copy of the image is to be stored to a location in addition to the destination host, version information specifying which version of the document has been scanned, update information specifying whether the document may be updated, a digital signature of the originator of the document, and a public key of an originator of the document.

50. The apparatus defined in claim 45 wherein the processing unit extracts information from the image and uploads extracted information along with the image information.

51. The apparatus defined in claim 45 wherein the processing unit associates a tracking number with a stored version of the image and sends the tracking number with the upload of the image to the destination host.

52. The apparatus defined in claim 51 wherein the processing unit retrieves the image from storage in response to a request for the image from the destination host using the tracking number and sends the retrieved image to the destination host.

53. The apparatus defined in claim 45 wherein the communication interface receives a response from the destination server indicating whether uploading of the image was successful.

54. The apparatus defined in claim 45 wherein the communication interface receives a response from the destination host indicating whether uploading of the image was successful; and
sends a copy of the response to the device specified in the additional machine readable information.

55. The apparatus defined in claim 45 further comprising a marking unit to mark the paper with a new identifier to indicate that the paper has been processed.

56. An article of manufacture having one or more computer readable storage media storing instructions thereon which, when executed by a system, cause the system to perform a method comprising:
scanning a version of a document to obtain an image, the document having machine readable information;
decoding the machine readable information from the image to obtain a destination specification;
uploading information corresponding to the image directly to a selected storage location of a destination host specified by the destination specification upon determination that the destination host is not on a list of destination hosts to which no images are permitted to be uploaded.

57. The article of manufacture defined in claim 56 wherein the image information comprises the image.

58. The article of manufacture defined in claim 56 wherein the destination specification comprises a destination server and a document identifier associated with the destination server.

59. The article of manufacture defined in claim 56 wherein decoding the machine readable information obtains metadata used to process upload image information.

60. The article of manufacture defined in claim 59 wherein the metadata includes one or more of a group consisting of an indication of the maximum number of pages in the document, an indication of the minimum number of pages in the document, a response field indicating whether to wait for a response from the destination host after uploading the image, timeout information indicating appropriate action to take in response to not receiving a response from the destination host after a period of time after uploading the image to the destination host when a response from the destination host is required, courtesy copy information indicating whether a copy of the image is to be stored to a location in addition to the destination host, version information specifying which version of the document has been scanned, update information specifying whether the document may be updated, a digital signature of the originator of the document, and a public key of an originator of the document.

61. The article of manufacture defined in claim 56 wherein the method further comprises extracting information from the image and uploading extracted information along with the image information.

62. The article of manufacture defined in claim 56 wherein the method further comprises associating a tracking number with a stored version of the image and sending the tracking number with the upload of the image to the destination host.

63. The article of manufacture defined in claim 62 wherein the method further comprises retrieving the image from storage in response to a request for the image from the destination host using the tracking number and sending the retrieved image to the destination host.

64. The article of manufacture defined in claim 56 wherein the method further comprises receiving a response from the, destination server indicating whether uploading of the image was successful.

65. The article of manufacture defined in claim 56 wherein the method further comprises
   receiving a response from the destination host indicating whether uploading of the image was successful; and
   sending a copy of the response to the device specified in the additional machine readable information.

66. A method comprising:
   receiving a tracking number associated with an image of a document, the tracking number obtained from a destination decoded from the image and to which the image had been uploaded directly upon determination that the destination is not on a list of destinations to which no images are permitted to be uploaded;
   generating a request using the tracking number;
   sending the request to a server; and
   receiving the image or information related to the image in response to the request.

67. The method defined in claim 66 wherein the request is generated by a destination host and further wherein the server comprises an upload client.

68. The method defined in claim 66 wherein the server is a destination host.

69. The method defined in claim 66 wherein the request specifies additional annotation information, and further comprising the server adding the annotation information to annotations stored with the image information to create updated annotations for the image.

70. The method defined in claim 69 further comprising the server signing the updated annotation information.

71. The method defined in claim 69 further comprising the server responding with the updated annotation information and a signature.

72. The method defined in claim 69 further comprising the server sending a new request to another device, the new request including the updated annotations.

73. The method defined in claim 72 wherein the another device is specified in the tracking number.

74. The method defined in claim 72 wherein the another device is specified in an upload specification corresponding to the document.

75. The method defined in claim 66 wherein the request is encrypted using an identifier corresponding to the tracking number.

76. The method defined in claim 75 wherein the tracking number is a hash of the identifier.

77. The method defined in claim 66 wherein received information is encrypted using an identifier corresponding to the tracking number.

78. The method defined in claim 77 wherein the tracking number is a hash of the identifier.

79. A method comprising:
   receiving annotations and a tracking number, the tracking number obtained from a destination decoded from an image and to which the image had been uploaded directly upon determination that the destination is not on a list of destinations to which no images are permitted to be uploaded;
   locating stored annotations in response to the tracking number;
   updating the stored annotations; and
   sending the updated annotations to a requester.

80. The method defined in claim 79 wherein locating a stored decryption key and the stored annotations are performed using the tracking number.

81. The method defined in claim 79 further comprising sending a signature to the requester.

82. The method defined in claim 79 wherein annotations are encrypted using a key associated with the tracking number.

83. The method defined in claim 82 wherein the tracking number is computed from the encryption key.

* * * * *